United States Patent [19]
Brooks

[11] 3,967,185

[45] June 29, 1976

[54] GENERATOR FREQUENCY CONVERTER

[75] Inventor: William E. Brooks, Houston, Tex.

[73] Assignee: Pravel & Wilson, Houston, Tex.

[22] Filed: Apr. 29, 1974

[21] Appl. No.: 464,772

[52] U.S. Cl...................................... 321/61; 321/66; 290/1 R
[51] Int. Cl.²............................................ H02M 5/27
[58] Field of Search.................. 321/60, 61, 64, 65, 321/66, 69 R; 318/171, 231; 322/14, 15; 290/1 R

[56] References Cited
UNITED STATES PATENTS

| | | | |
|---|---|---|---|
| 2,573,137 | 10/1951 | Greer | 321/66 |
| 3,246,231 | 4/1966 | Clarke | 321/69 R |
| 3,259,752 | 7/1966 | Honda | 290/1 R |
| 3,270,270 | 8/1966 | Yenisey | 321/18 |
| 3,297,937 | 1/1967 | Benchimol | 321/66 |
| 3,355,647 | 11/1967 | Braus | 321/61 |
| 3,493,843 | 2/1970 | Ireland et al. | 321/61 |
| 3,663,945 | 5/1972 | Hughes et al. | 321/61 |
| 3,718,854 | 2/1973 | Spyrou | 321/69 R |

OTHER PUBLICATIONS

IBM Technical Disclosure Bulletin, "Frequency Converter," vol. 13, No. 12, pp. 3727-3728.
D. W. Onan & Sons Specification Sheet for Model 12 DL-13 Portable Electric Generating Plant.

*Primary Examiner*—William M. Shoop
*Attorney, Agent, or Firm*—Pravel & Wilson

[57] ABSTRACT

A frequency converter for use with a generator, particularly a gasoline engine driven generator, to provide electrical power at a suitable frequency through a power switching circuit with a timing control circuit to protect the power switching circuit.

4 Claims, 3 Drawing Figures

GENERATOR FREQUENCY CONVERTER

BACKGROUND OF INVENTION

1. Field of Invention

The present invention relates to electronic frequency conversion of the power output of generators.

2. Description of Prior Art

Prior art frequency converters, such as the circuits of U.S. Pat. Nos. 3,089,992; 3,493,843 and 3,593,104, have been attempts to control the frequency of electric power from a generator or power source to a suitable frequency which was within the operating frequency limits of the load being driven. The inductive loads of these converters have posed problems due to "flyback" voltages when current flow in these inductive elements was interrupted or terminated.

These prior art attempts have, so far as is known, typically rectified the higher frequency generator output in one or more full-wave rectifier bridges in complicated circuitry to form groups of unidirectional pulses which were gated from the rectifiers to the load or loads through electronic switching circuits, such as silicon-controlled rectifiers (SCR's), which in operation exhibited erratic switching characteristics unless timing precautions were taken. For example, in attempting to turn-off an SCR by bringing anode and cathode potential to zero volts, such potential had to remain at zero for a given length of time known as "turn-off" time. With full-wave rectification, however, only an instantaneous voltage level of zero was present before voltage levels swung positive again.

In the circuit of U.S. Pat. No. 3,089,992, an expensive precision-controlled oscillator was used to achieve precise timing control of switching to transfer power from full-wave rectifiers at a desired frequency, attempting to prevent a timing imbalance of the times of negative and positive polarity output from the converter which would present an undesirable direct current flow in inductive elements. The circuit of U.S. Pat. No. 3,593,104 was intended for conversion of frequencies ranging from within a suitable range for the load to greatly in excess of the suitable range, and thus involved relatively complex circuitry because of the frequency range.

In the frequency converter circuit in U.S. Pat. No. 3,493,843, inhibiting circuitry rendered two full-wave, gatecontrolled rectifier bridges inoperative for one-half cycle of the input frequency when power connections to the bridges were being changed after a predetermined count of input frequency half-cycles.

SUMMARY OF INVENTION

Briefly, the present invention provides a new and improved apparatus for converting the output frequency of electrical power from an electrical generator.

The apparatus includes power switching means having first switching means for switching output pulses of a first polarity and second switching means for switching output pulses of a second polarity to the load. A timing control circuit of the apparatus controls the operating frequency of the power switching means, and includes frequency divider means forming output pulses at a fraction of the output frequency of the generator, and a control signal generator for alternatively energizing the first and second switching means to provide power to the load in response to output pulses from the frequency divider.

The present invention further includes a timing control for introducing a time delay between each of the output pulses of the frequency dividers furnished to the control signal generator so that the switching elements in the non-conducting switching means of the power switching means do not become conductive prior to de-energizing the conducting switching means.

The power switching means of the present invention is thus permitted to be directly connected to the stator of the generator and performs the rectification and switching functions without requiring complex timing and counting circuitry.

It is an object of the present invention to provide a new and improved apparatus for converting the output frequency of electrical power from an electrical generator.

DESCRIPTION OF PREFERRED EMBODIMENT

Figure 1:
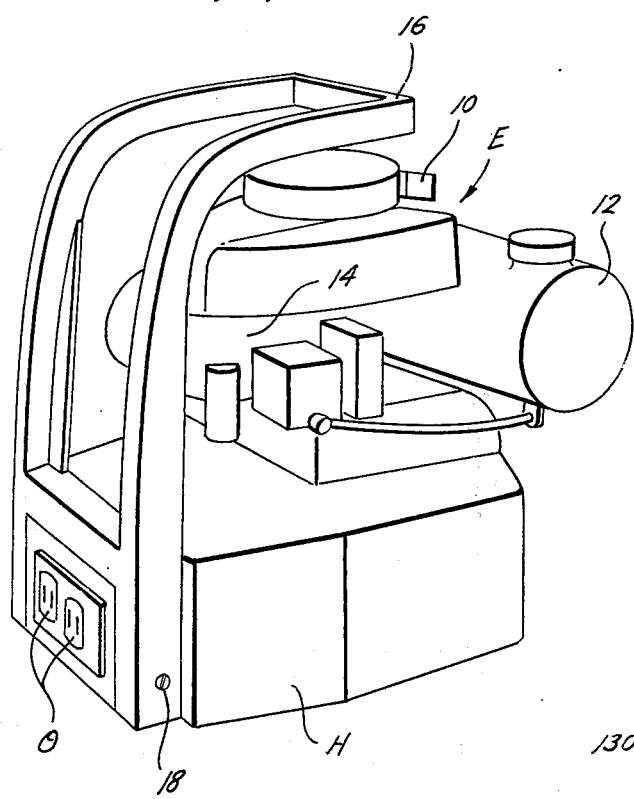
FIG. 1 is an isometric drawing of a generator with the apparatus of the present invention mounted therewith.

In the drawings, the letter A designates generally the apparatus of the present invention for converting the output frequency of electrical power from an electrical generator G and regulating the voltage output thereof as the output frequency of the generator varies.

Figure 2:
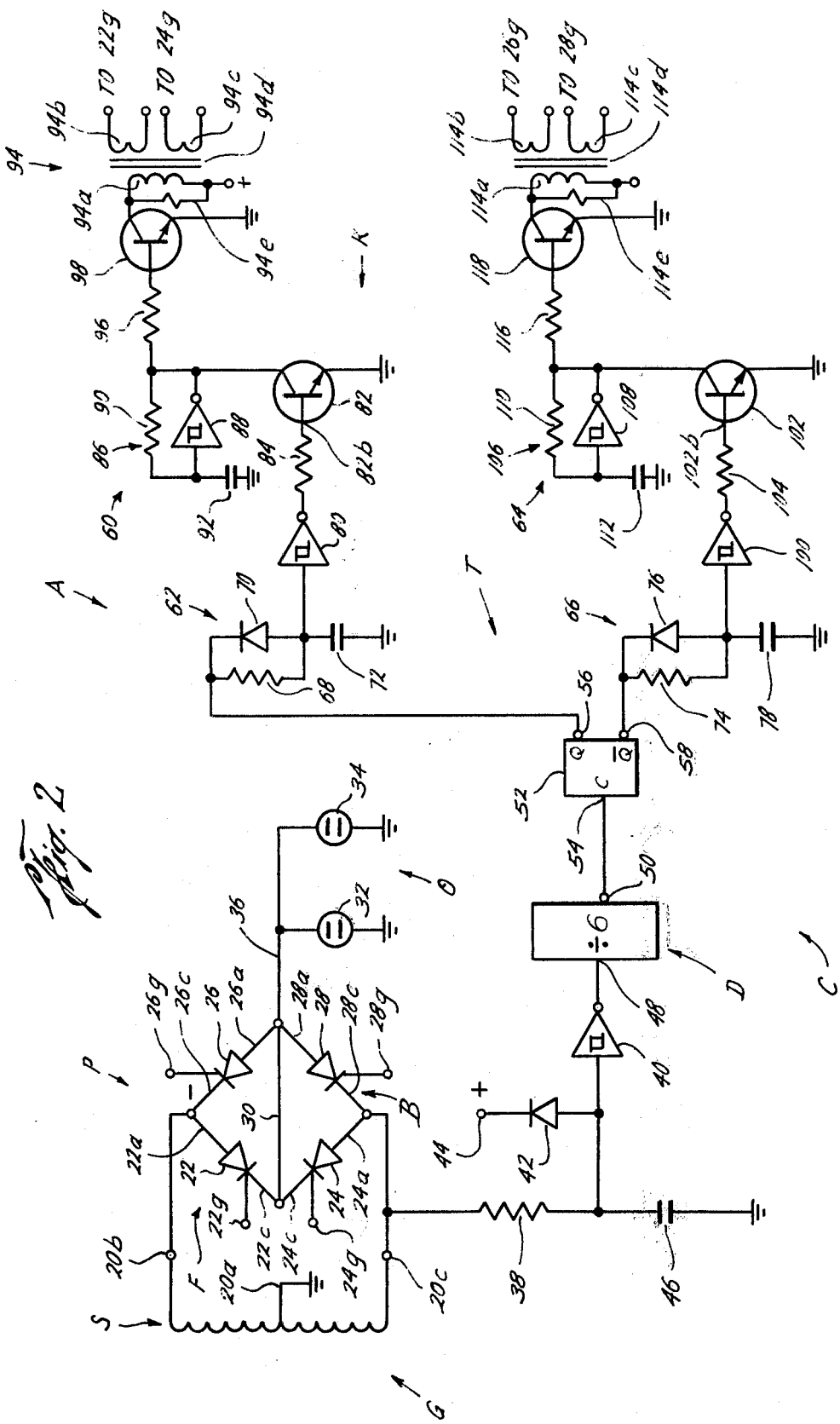
FIG. 2 is a schematic electrical circuit diagram of the apparatus of the present invention.

The electrical generator G is a conventional electrical generator, driven in the preferred embodiment by a suitable internal combustion engine E, which may be, for example, a light weight, low horse power gasoline burning engine, having a pull starter cord grip handle 10, fuel tank 12 and engine body 14. The generator G is a conventional electrical generator operating at a frequency, for example 700 hertz, determined by the operating speed, or revolutions per minute of the engine E, and having a stator coil S (FIG. 2) providing output electrical power at the operating frequency of the generator. As is typical with this type of engine-driven generator, the output voltage increases and decreases according to increases and decreases in speed of the engine E.

The apparatus A receives output power from the generator G and, in a manner to be set forth below, converts the frequency of such power to a desired output frequency, for example 60 hertz, to drive conventional electrical loads and motors, and provides such power at this frequency through an electrical outlet O to the electrical load.

The apparatus A and the generator G are mounted in a housing H (FIG. 1), with the outlet O mounted on the housing H so that electrical plugs from the electrical loads being driven may be inserted therein to receive electrical power from the generator and the apparatus A at the desired output frequency. A carrying handle 16 is mounted with the housing H by screws 18 or other suitable means for ease of transport and handling of the engine E and the generator and the apparatus A mounted in the housing H therewith.

Considering the apparatus A more in detail, the stator coil S of the generator G (FIG. 2) is electrically grounded at a center tap 20a thereof and receives electromagnetic energy from a conventional rotor of the generator G. The stator coil S provides two phase opposite output voltages at output terminals 20b and 20c thereof at a frequency controlled by the speed of the engine E, as has been set forth.

A power switching circuit P of the apparatus A is directly electrically connected to the stator coil S, for reasons to be set forth. The power switching circuit P includes a first switch bank F and a second switch bank B operating at a frequency controlled by a control circuit C.

The first switch bank F switches output pulses of a first electric polarity, positive, to the electrical load being driven through the electrical connection to the outlet O, while the second switch bank B switches output pulses of a second polarity, negative, to the electrical load through the outlet O.

The control circuit C controls the operating frequency of the power switching circuit P, as has been set forth, and includes a frequency divider circuit D which forms output pulses at a fraction of the output frequency of the generator by counting a predetermined number of input pulses which occur at the frequency of the generator, and forming an output pulse when the predetermined count number is reached. A control signal generator K of the control circuit C alternately energizes the first switch bank F and the second switch bank B to provide power through the outlet O to the load in response to pulses from the frequency divider circuit D.

A timing control circuit T introduces a fixed duration time delay between the output pulses of the frequency divider D, in a manner to be set forth, in order to insure that switching elements in the nonconducting switch bank of the power switching circuit P are not energized to become conductive prior to turning off or de-energizing the switching elements in the conducting switch bank.

Considering the power switching circuit P more in detail, the first switch bank F and the second switch bank B are formed from voltge threshold responsive electrical switch elements, in the preferred embodiment silicon-controlled rectifiers (SCR's). The switching elements of the first switch bank F include a switch element 22 electrically connected at an anode terminal 22a to the output terminal 20b of the stator coil S, and a switch element 24 electrically connected at an anode terminal 24a to the output terminal 20c of the stator coil S. The switch elements 22 and 24 are electrically connected in common at cathode terminals 22c and 24c, respectively.

The switch element 22 permits electric current to flow from the stator coil S through anode terminal 22a to the cathode terminal 22c when energized by positive voltage at a gate terminal 22g thereof in the presence of a positive anode to cathode potential, with such current continuing to flow therethrough until the potential present at the anode terminal 22a becomes negative with respect to the potential present at the cathode terminal 22c. In a like manner, the switch 24 permits electrical current to flow from the anode terminal 24a to the cathode terminal 24c when energized by a positive voltage at a gate terminal 24g in the presence of a positive anode to cathode potential with such current continuing to flow therethrough until the voltage present at the anode terminal 24a becomes negative with respect to the voltage present at the cathode terminal 24c.

The gate terminals 22g and 24g of the switching elements 22 and 24, respectively, are energized, in a manner to be set forth below, by the control circuit C to permit flow of current therethrough from the power switching circuit P to the electrical outlet O. When the switching elements 22 and 24 are not energized, they perform a rectifying function, preventing the flow of electrical current therethrough.

Similarly, the switching elements of the second switch bank B include a switch element 26 electrically connected at a cathode terminal 26c to the output terminal 20b of the stator coil S in common with the anode terminal 22a of the switch element 22 of the first switch bank F. A switch element 28 of the second switch bank B is electrically connected at a cathode terminal 28c to the output terminal 20c of the stator coil S in common with the anode terminal 24a of the switch element 24 of the first switch bank F.

The switch elements 26 and 28 of the second switch bank S are electrically connected in common at anode terminals 26a and 28a, respectively. The switch element 26 permits electrical current to flow from the anode terminal 26a to the cathode terminal 26c when energized by a positive voltage at a gate terminal 26g in the presence of a negative cathode to anode potential, with such current continuing to flow therethrough until the anode terminal 26a is at a negative potential with respect to the cathode terminal 26c. In a like manner, the switch element 28 permits electrical current to flow from the anode terminal 28a to the cathode terminal 28c when energized by a positive voltage at a gate terminal 28g in the presence of a negative cathode to anode potential with current continuing to flow therethrough until the anode 28a is negative with respect to the cathode 28c.

The gate terminals 26g and 28g of the switch elements 26 and 28 are energized, in a manner to be set forth below, by the control circuit C. When the switch elements 26 and 28 are not electrically conducting, they perform a rectifying function, preventing the flow of electrical current therethrough.

The common connection of the cathode terminals 22c and 24c of the switch elements 22 and 24 of the first switching bank F and the common connection of the anode terminals 26a and 28a of the switch elements 26 and 28 of the second switch bank B are electrically connected in common by a conductor 30 which is electrically connected to electrical sockets 32 and 34 of the output O by an electrical conductor 36.

The control circuit C alternately energizes the first switch bank F and the second switch bank B for alternate half-cycle switching intervals, at the desired output frequency formed by the frequency divider D from the generator frequency, in a manner to be set forth below.

During a first half-cycle switching interval, when the first switch bank F is energized, triggering pulses at a frequency substantially higher than that of the generator G are formed in the control circuit C and furnished to energize gate terminals 22g and 24g of the switch bank F.

The switch elements 22 and 24, upon receipt of such triggering pulses, are switched into a conductive state if the voltage output at terminals 20b and 20c are positive with respect to the cathode terminals 22c and 24c thereof, and continue to conduct for the remainder of such positive half-cycle of the generator frequency. In order to insure presence of a triggering pulse early during each positive half-cycle of the generator frequency in the first switching interval, the triggering pulses occur at a substantially higher frequency, such as 44 kilohertz, than the generator frequency, which is typically on the order of 700 hertz.

During half-cycles when the terminal 20b is positive during the first half-cycle switching interval, the switch element 22 conducts, while the switch element 24 performs a rectifying function, blocking current flow therethrough, so that current flows through only switch element 22. Similarly, on alternate half-cycles when the terminal 20c is positive during the first half-cycle switching interval, the switch element 24 conducts current therethrough while the switch element 22 performs the rectifying function.

When the switch elements 22 and 24 are thus alternately conducting current during the first switch interval, in the manner set forth above, electrical pulses of positive polarity flow from the output terminals 20b and 20c through the conductive switch elements to the outlet O through electrical conductors 30 and 36. In this manner, direct electrical connection of the switch elements 22 and 24 with the stator coil S is made possible.

During a second half-cycle switching interval, when the second switch bank B is energized, triggering pulses at the substantially higher frequency are formed in the control circuit C and furnished to energize gate terminals 26g and 28g of the switch bank B.

The switch elements 26 and 28, upon receipt of such triggering pulses, are switched into a conductive state if the voltage difference between the anode and cathode terminals thereof is positive, i.e. the anode terminals are at electrical ground with respect to negative polarity cathode terminals. After being switched conductive in this manner, the switch elements 26 and 28 continue to conduct for the remainder of such half-cycle of the generator frequency. In order to insure presence of a triggering pulse early during each such half-cycle, the triggering pulses occur at the substantially higher frequency, as has been set forth.

During the half-cycles of the second switching interval when the output terminal 20b is negative with respective to ground and terminal 20c is positive the switch element 26 conducts and the switch element 28 performs a rectifying function, blocking current flow therethrough. Similarly, during the half-cycles when the terminal 20c is negative, the switch element 28 conducts, and the switch element 26 blocks current flow.

When the switch elements 26 and 28 are thus alternately conducting during the second switch interval in the manner set forth above, electrical pulses of negative polarity flow through the output terminals 20b and 20c to the grounded center tap 20a through the conductive switch element from the outlet O through the electrical conductor 36. In this manner, direct electrical connection of the switch elements 26 and 28 to the stator coil S is possible.

Thus, the power switching circuit P of the apparatus A is in the form of four voltage threshold responsive electrical switching elements directly electrically connected to the stator coil S in an electrical bridge arrangement. When connected in this manner, the switch elements in the power switching circuit P both rectify and switch the electrical power to the load through the electrical outlet O, as has been set forth. With the power switching circuit P directly connected to the stator coil S, the apparatus A of the present invention materially reduces the number of electrical circuit components required to furnish the power to the load, a considerable reduction in the complexity of circuitry and the expense of circuit components over the prior art.

Considering the control circuit C more in detail, an input resistor 38 electrically connected to the output terminal 20c of the stator coil S receives a portion of the output electrical energy from the generator G at the output frequency of the generator G and limits the input current provided to a Schmitt-trigger inverter amplifier 40. The Schmitt-trigger amplifier 40 is a conventional electronic circuit component, such as, for example, that sold by Texas Instruments as part number SN5414, and forms inverted square wave output pulses in response to the receipt of input waveforms to such Schmitt-trigger amplifier 40. The inverted square wave output pulses from the amplifier 40 are provided to the frequency divider circuit D.

A diode 42 electrically connected to a positive limit potential 44 is electrically connected at the input of the amplifier 40 in order to limit the input voltage applied to the amplifier 40. A noise filter capacitor 46 is electrically connected between the input resistor 38 and electrical ground in order to filter unwanted noise and transients, received from the stator coil S through the input resistor 38, and prevents such unwanted noise from reaching the amplifier 40.

The frequency divider of circuit D receives the square wave output pulses from the amplifier 40 at the frequency of the generator G at an input terminal 48, and responds to the input pulses received at the input terminal 48 and forms output pulses at a predetermined fraction of the output frequency of the generator G, with the predetermined fraction representing the degree of frequency reduction required in the frequency conversion performed in the apparatus A. The frequency divider D may be any conventional digital pulse counting circuit, for example a Texas Instruments Part Number SN7492, "Divide by 12", which achieves the desired degree of frequency division to accomplish frequency reduction. The frequency divider D counts the input pulses and forms output pulses at an output terminal 50 each time the desired count of input pulses, for example 6, is received at the input 48.

An alternator flip-flop 52 receives output pulses from the frequency divider D at an input 54 and further divides the frequency of these pulses by 2 and provides output pulses alternately at a Q output 56 and a $\overline{Q}$ output terminal 58. When the Q output 56 is energized, the $\overline{Q}$ output 58 is de-energized, and conversely, when the $\overline{Q}$ output 58 is energized, the Q output 56 is de-energized, as is conventional in flipflop circuits.

The alternator flip-flop 52 activates a first signal generator 60 of the ccontrol signal generator K through a first time delay circuit 62 of the timing control circuit T with pulses from the Q output terminal 56. The alternator flip-flop 52 activates a second signal generator 64 of the control signal generator K through a second timed delay circuit 66 of the timing control circuit T by means of pulses at the $\overline{Q}$ output terminal 58.

As will be set forth, the time delay circuits 62 and 66 introduce a time delay between each of the output pulses of the frequency divider D furnished through the alternator flip-flop 52 before such output pulses are furnished to the control signal generator K, to thereby insure that simultaneous energization of both sets of power switching circuit P is prevented. Thus, the time delay circuits 62 and 66 insure that switching elements in the non-conducting switch bank of the power switching circuit P are not energized to become conductive prior to de-energizing the conductive switching elements therein.

The time delay circuit 62 includes a resistor 68 and a diode 70 electrically connected in a parallel circuit arrangement, and a capacitor 72 electrically connecting the parallel resistor 68 and diode 70 to ground. The resistor 68 permits electrical current to flow from the Q output 56 of the alternator flip-flop 52, when such output is logic "1" or high, to charge the capacitor 72, with the resistance of the resistor 68 and the capacitor 72 determining the time constant of the time delay circuit 64, which may be, for example, 0.1 milliseconds. The diode 70 bypasses the resistor 68 and permits rapid discharge of the capacitor 72 when the Q output 56 of the alternator flip-flop 52 is at logic "0" of low, so that the fixed duration time delay of the time delay circuits 62 is introduced only each time that the Q output 56 of the flip-flop 52 is initially energized.

The time delay circuit 66 includes a resistor 74 and a diode 76 electrically connected in a parallel electrical circuit arrangement, and a capacitor 78 electrically connecting the parallel resistor 74 and diodes 76 to ground. A resistor 74 permits electrical circuit to flow from the $\overline{Q}$ output 58 of the flip-flop 52, when such output is logic "1" or high, to charge the capacitor 78, with the resistance of the resistor 74 and the capacitance of the capacitor 78 determining the time constant in the manner set forth above. The time delays introduced by the time delay circuit 62 and 66 are substantially equal.

The diode 76 bypasses the resistor 74 and permits rapid discharge of the capacitor 78 when the $\overline{Q}$ output 58 of the flip-flop 52 is logic "0" or low, so that the fixed duration time delay of the time delay circuit 66 is introduced only each time that the $\overline{Q}$ output 58 of the flip-flop 52 is initially energized.

The first signal generator 60 of the control signal generator K receives alternate ones of the output pulses of the frequency divider D through the alternator flip-flop 52 at an input Schmitt-trigger amplifier 80, of the type set forth above, which forms inverted square wave output pulses from the pulses received from the time delay circuit 62 and energizes a switching transistor 82 at a base terminal 82b thereof through an input current limiting resistor 84.

The switching transistor 82 switches off an oscillator circuit 86 when energized to be conductive by pulses from the trigger 80, and permits oscillator circuit 86 to oscillate when not conducting. The oscillator circuit 86 includes a Schmitt-trigger amplifier 88 and a feedback resistor 90 and capacitor 92 which determine the frequency of the output pulses formed in the oscillator 86.

The oscillator circuit 86 forms output pulses at a frequency, for example 44 kilohertz, substantially higher than the frequency of the generator G, as has been set forth, and provides such pulses to a primary winding 94a of a pulse transformer 94 through a coupling resistance 96 and a buffer transistor 98 when energized.

The pulse transformer 94 includes a secondary winding 94b and a secondary winding 94c, magnetically linked to the primary 94a by a core 94d, which secondary windings respond to pulses received at the primary winding 94a to activate the power switching circuit P.

The secondary winding 94b is electrically connected at one of its output terminals with the gate terminal 22g of the switch element 22 in the power switching circuit P and at the other of its output terminals to the cathode terminal 22c, by means of electrical conductors not shown in the drawings. A clamp resistor 94e is connected in parallel with the primary coil 94a to protect switch elements 22 and 26 from overheating due to inductive "flyback" voltages formed when current flow in transformer 94 is terminated. Similarly, the secondary winding 94c is electrically connected at one of its output terminals to the gate terminal 24g and at the other of its output terminals to cathode 24c of the switch element 24 in the power switching circuit P by means of electrical conductors not shown.

The second signal generator 64 of the control signal generator K receives alternate ones of the output pulses of the frequency divider D through the alternator flip-flop 52 at an input Schmitt-trigger amplifier 100, of the type set forth. The Schmitt-trigger 100 forms inverted square wave output pulses from the pulses received from the time delay circuit 66 and energizes a switching transistor 102 at a base terminal 102b thereof through an input current limiting resistor 104.

The switching transistor 102 switches off an oscillator circuit 106 when energized to be conductive by pulses from the trigger 100, and permits oscillator circuit 106 to oscillate when not conducting. The oscillator circuit 106 includes a Schmitt-trigger amplifier 108 and a feedback resistor 110 and capacitor 112 which determine the frequency of the output pulses of the oscillator circuit 106, which is substantially equal to the frequency of the oscillator 86 in the first signal generator 60.

The oscillator circuit 106 provides the output pulses formed therein to a primary winding 114a of a pulse transformer 114 through a coupling resistor 116 and buffer transistor 118 when energized. The pulse transformer 114 includes secondary windings 114b and 114c magnetically linked to the primary 114a by a core 114d. The secondary windings 114b and 114c respond to pulses received at the primary winding 114a and activate the second bank S of the power switching circuit P.

The secondary winding 114b is electrically connected at one of its output terminals to the gate terminal 26g and at the other of its output terminals to cathode 26c of the switch element 26 in the power switching circuit P by electrical conductors. Similarly, the secondary winding 114c is electrically connected at one of its output terminals to the gate terminal 28g and at the other of its output terminals to cathode 28c of the switching element 28 in the power switching circuit P. Further, a clamp resistor 114e is connected in parallel with the primary 114a to protect switching elements 26 and 28, in a like manner to the operation of clamp resistor 94e as set forth.

Figure 3:
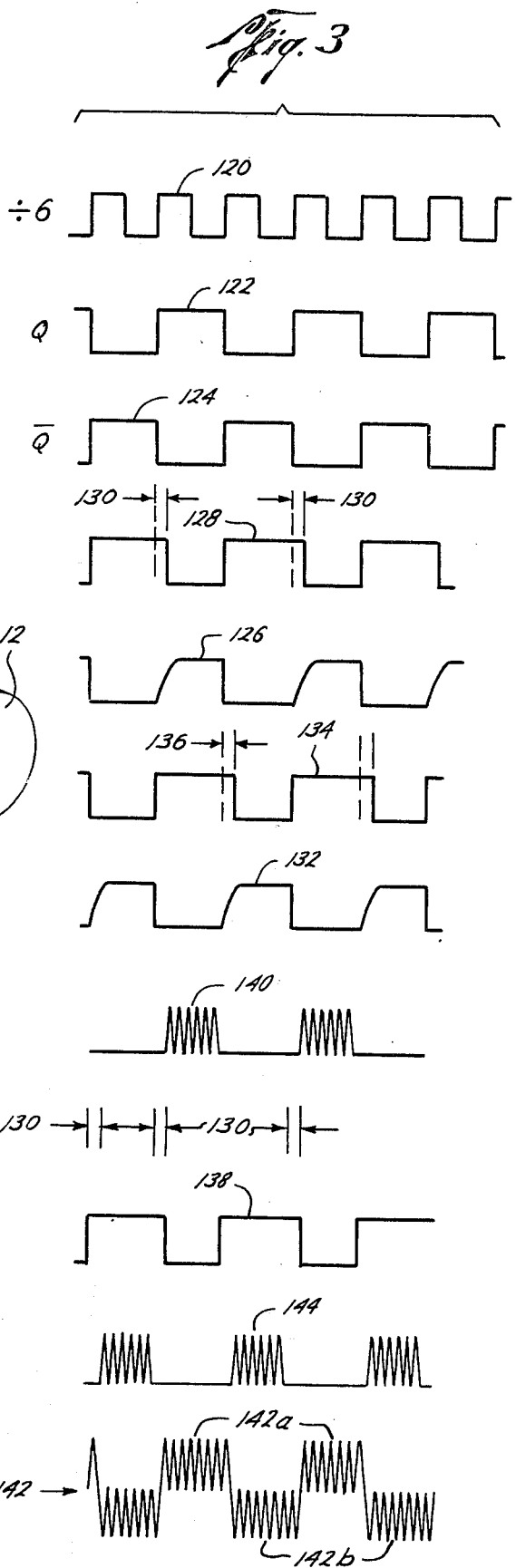
FIG. 3 is a group of schematic diagrams of electrical waveforms present in the circuit of FIG. 2.

In the operation of the present invention (FIGS. 2 and 3), a waveform 120 schematically illustrates the output of the frequency divider D, formed at a fraction of the output of the generator G in response to the pulses of the generator G at the higher output frequency to be connected in the apparatus A. The alternator flip-flop 52 receives the output signal waveform 120 from the frequency divider D and forms at its Q output terminal 56 the first half-cycle switching interval for operation of the power switching circuit P, as indicated by a waveform 122, and the second half-cycle switching interval for the power switching circuit P, as indicated by a waveform 124, respectively.

The time delay circuit 62 responds to each initial energization of the Q output terminal 56 of the alternator 52 during the first switching interval and forms an output waveform 126 in response to the initial voltage rise in waveform 122, which is provided to the Schmitt-trigger 80. However, because of the resistor 68 and capacitor 72, the time for the level of the waveform 126 to reach a sufficient level to activate the Schmitt-trigger 80 is delayed, causing formation in the trigger 80 of an output waveform 128 having a fixed duration time delay, as indicated by a time interval or gap 130. In a like manner, the time delay circuit 64 responds to initial energization of the $\overline{Q}$ terminal 58 in the second switching interval and forms an output wave form 132 in response to the waveform 124, with the delay in output level rise in the time delay circuit 64 causing formation in the trigger 100 of the output waveform 134 having a fixed duration time delay, as indicated by a time interval gap 136. The presence of bypass diodes 70 and 76 in the time delay circuits 62 and 66 prevents occurrence of time delays at the end of the first and second switching intervals, respectively, so that inadvertent simultaneous activation of both the first switch bank F and second switch bank B is prevented. This timing precaution permits the power switching circuit P to be directly connected to the stator coil S, while reducing the likelihood of short circuits or other undesirable events during power switching. It is to be noted that timing precautions are obtained at a considerable reduction in circuit complexity over the prior art with the present invention.

The transistor 82 forms a waveform 138 in response to the output waveform 128 from the Schmitt-trigger 80, permitting the oscillator circuit 86 to form a series of switch element triggering pulses, indicated by a waveform 140 when transistor 82 is not conducting, which are coupled by the pulse transformer 94 to energize the switching elements 22 and 24 of the first switching bank F of the power switching circuit P during the first switching interval. The triggering pulses in the waveform 140 in the first switching interval cause the first switching bank F to switch pulses of positive polarity from the stator coil S to the output O as electrical power for the duration of the first switching interval, as indicated by a positive half-cycle 142a of a waveform 142, schematically indicating the power output of the apparatus A.

In a like manner, the transistor 102 permits the oscillator circuit 106 to form a series of triggering pulses, indicated by a waveform 144, which are coupled by the pulses transformer 114 to energize the switching elements 26 and 28 of the second switch bank S of the power switching circuit P during the second switching interval. The triggering pulses in the waveform 144 in the second switching interval cause the second switch bank S to permit pulses, of electrical power of opposite polarity to the first switching interval as indicated by a negative half-cycle 142b of the waveform 142, to flow between the stator coil S and output outlets O.

The alternation between positive and negative half-cycles in the pulses of power in the waveform 142 takes place at a fundamental frequency corresponding to the desired output frequency of the apparatus A.

The time scale of the triggering pulses in waveforms 140 and 144 has been adjusted from the scale of the other waveforms in view of the substantially higher frequency of such pulses, so that the nature thereof may be set forth in the drawings.

The foregoing disclosures and description of the invention are illustrative and explanatory thereof, and various changes in the size, shape, materials, components, circuit elements, wiring connections and contacts as well as in the details of the illustrated circuitry and construction may be made without departing from the spirit of the invention.

I claim:

1. An apparatus for converting the output frequency of electrical power from an electrical generator, comprising:
    a. power switching means for switching the power output of the generator to a load, said power switching means comprising:
        1. first switching means for switching output pulses of a first electrical polarity to the load;
        2. second switching means for switching output pulses of a second electrical polarity to the load;
        3. said first and second switching means being electrically connected to a stator winding of the generator;
        4. said first switching means comprises a first switch element and a second switch element, each having a control electrode, said first switch element and said second switch element permitting current to flow therethrough from the stator winding of the generator to the load in response to a first control signal;
        5. said first switch element and said second switch element each having an anode, connected to the stator winding, and a cathode connected to the cathode of the other;
        6. said second switching means comprises a third switch element and a fourth switch element, each having a control electrode, said third switch element and said fourth switch element permitting current to flow therethrough from the stator winding of the generator to the load in response to a second control signal;
        7. said third switch element and said fourth switch element each having an anode, the cathode of the third switch element being directly connected to the anode of the first element and the stator winding, the cathode of the fourth switch element being directly connected to the anode of the second switch element and the stator winding; and
        8. said third switch element and said fourth switch element each further having an anode connected to the anode of the other, wherein said switch elements form a voltage responsive switching bridge directly connected to the stator winding; and
    b. control means for controlling the operating frequency of said power switching means, said control means comprising:
        1. frequency divider means forming output pulses at a fraction of the output frequency of the generator;
        2. control signal generator means for alternately energizing said first switching means and said second switching means to provide power to the load in response to output pulses from said frequency divider means, said control signal generator means having pulse transformer means for directly coupling the first control signal to said control electrodes of said switch elements of said first switching means and the second control signal to said control electrodes of said switch elements of said second switching means; and 3. timing control means for introducing a fixed duration time delay between each of the output pulses of said frequency divider means before such pulses are furnished to said control signal generator means wherein simultaneous energization of said first switching means and said second switching means is prevented.

2. The apparatus of claim 1, wherein said control signal generator means comprises:
a. first control signal generator means for energizing said first switching means; and
b. second control signal generator means for energizing said second switching means.

3. The apparatus of claim 2, further including:
alternator means responsive to said frequency divider means for alternately activating said first and second control signal generator means with pulses from said frequency divider means.

4. The apparatus of claim 3, wherein said timing control means comprises:
a. first time delay means for introducing a time delay to the pulses from said alternator means activating said first control signal generator means; and
b. second time delay means for introducing a time delay to the pulses from said alternator means activating said second control signal generator means.

* * * * *